Dec. 27, 1949  H. C. WOBSER ET AL  2,492,253
WATER HEATER
Filed Aug. 7, 1945  2 Sheets-Sheet 1
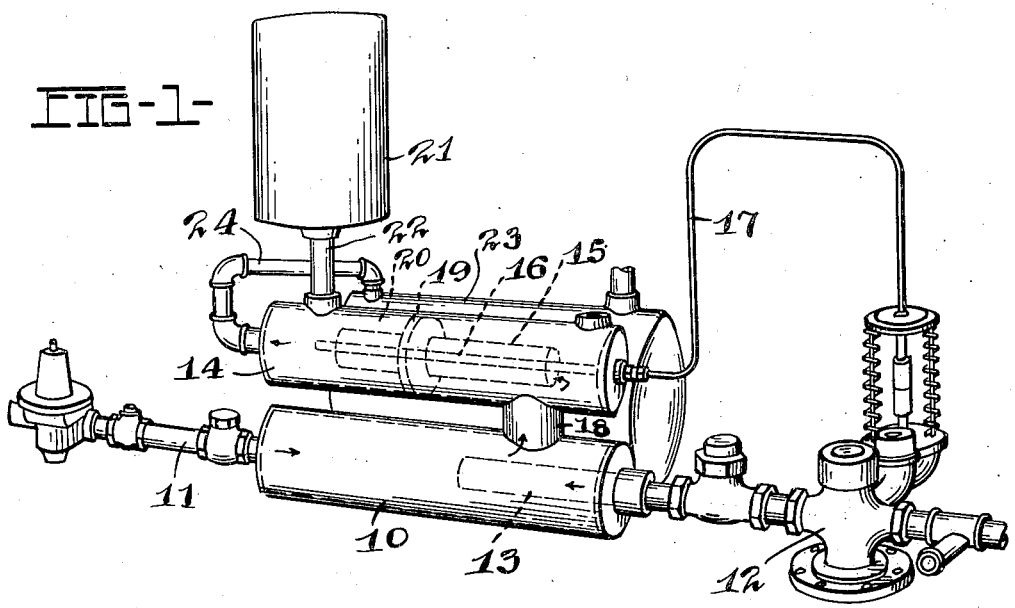
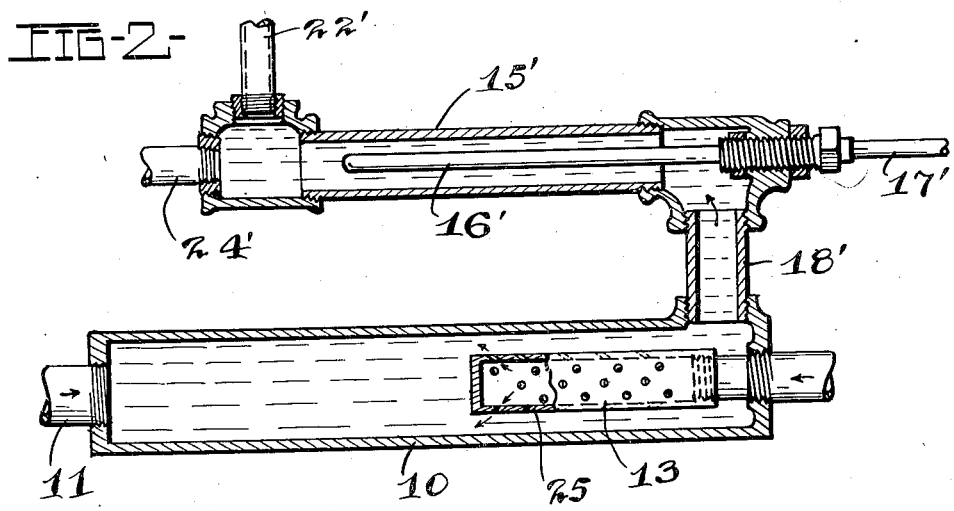
Inventors
HERMAN C. WOBSER
RAYMOND A. MONAHAN
By Owen & Owen
Attorneys Dec. 27, 1949  H. C. WOBSER ET AL  2,492,253
WATER HEATER
Filed Aug. 7, 1945  2 Sheets-Sheet 2
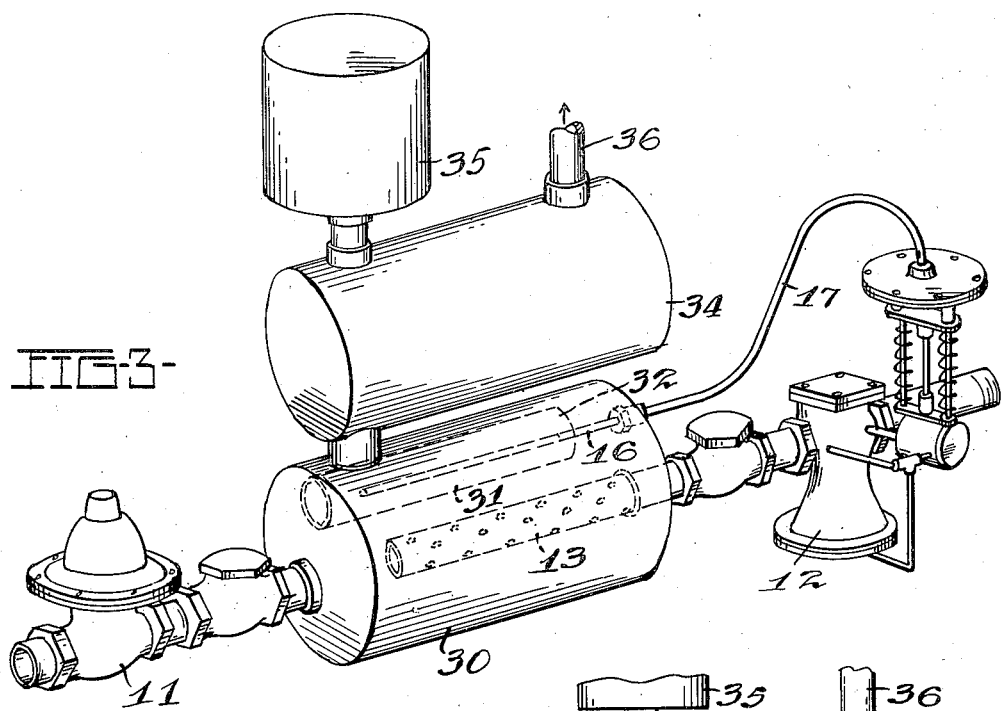
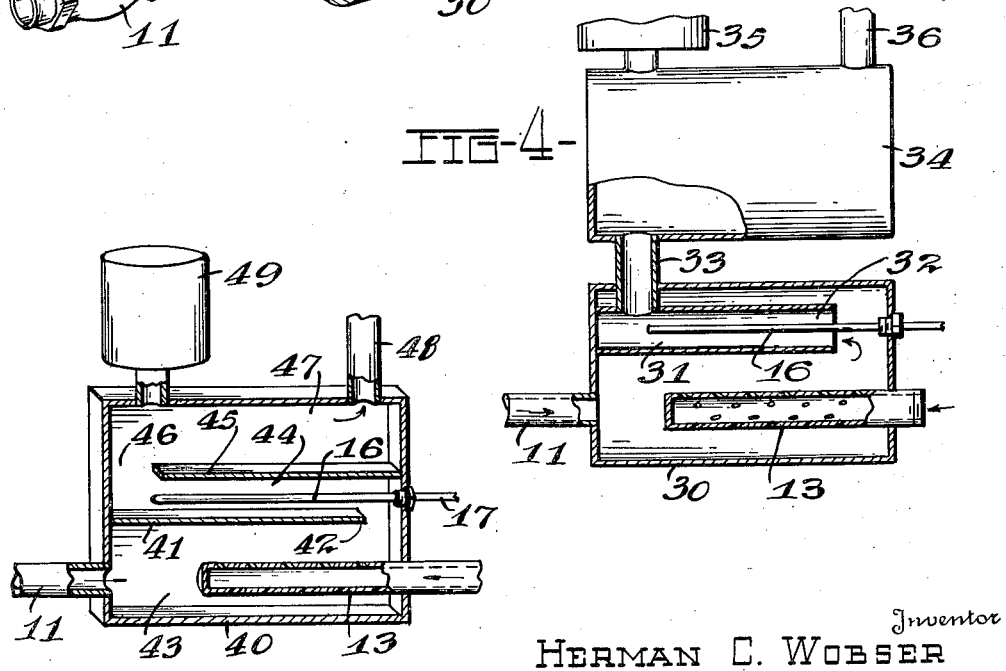
Inventor
HERMAN C. WOBSER
RAYMOND A. MONAHAN
By Owen & Owen
Attorneys Patented Dec. 27, 1949

2,492,253

UNITED STATES PATENT OFFICE 2,492,253

WATER HEATER

Herman C. Wobser, Sylvania, and Raymond A. Monahan, Toledo, Ohio, assignors to The Ramona Products Company, Toledo, Ohio, a corporation of Ohio Application August 7, 1945, Serial No. 609,340

6 Claims. (Cl. 261—39)

This invention relates to a water heater, and more particularly to the type of water heater where the water is heated by steam as it flows through a heating chamber.

This application is a continuation in part of our prior application No. 591,084, filed April 30, 1945, now abandoned.

An object of the invention is to provide apparatus whereby the water may be heated to an accurately controlled temperature and will flow smoothly and noiselessly through the apparatus. It has been found difficult to operate a heater of this kind without producing noise and without irregularities in the flow and objectionable variations in the temperature. It is the object of this invention to avoid these difficulties.

Another object of the invention is to provide apparatus in which there is provision for efficient thermostatic control of the intermittent admission of steam for maintaining the desired temperature of the water in the control chamber when little or no water is drawn off for a time, and the admission is for replacing heat loss through the walls of the apparatus.

Other objects and details of the invention will appear as the description proceeds.

In the accompanying drawings forming a part of this specification Figure 1 is an isometric elevation of one form of apparatus embodying the invention; Figure 2 is a longitudinal section of the apparatus showing a modified construction; Figure 3 is an isometric elevation of another embodiment of the invention; Figure 4 is a longitudinal vertical section of the heating portion of the form of apparatus shown in Fig. 3; and Figure 5 is a section similar to Fig. 4, but showing another embodiment of the invention.

In the apparatus as shown in Figure 1 there is a heating chamber 10 into which water flows from pipe 11. Steam may be introduced through a valve 12 to a nozzle 13 in the heating chamber. Above the heating chamber there is a temperature control chamber 14. In the form shown in Figure 1 this constitutes a cylindrical tube within which there is a smaller tube 15 open at both ends. A thermostat tube 16 is located within tube 15 and is provided with a connection 17, by which it controls valve 12. Heating chamber 10 is connected to temperature control chamber 14 by a pipe 18. Tube 15 is supported within chamber 14 by a partition 19 which spaces the tube from the walls of the chamber and provides around the tube, a water jacket space 20. This is desirable for controlling the variations in temperature.

Above the temperature control chamber there is an air chamber 21 connected to the temperature control chamber by a pipe 22. A relatively large blending chamber 23 is shown connected to the outlet end of the temperature control chamber by a pipe 24.

In the form shown in Figure 2 the heating chamber is the same as in Figure 1, and the parts hereof are numbered the same as in Fig. 1. However, in sectional view Fig. 2 there are shown the steam outlet passages 25 in nozzle 13.

In the form shown in Fig. 2 the temperature control tube 15', containing the thermostat 16' with its connection 17' to the steam valve, is not surrounded by a water jacket but is directly connected with the heating chamber by pipe 18' and with the air chamber by pipe 22' and is provided with an outlet 24'.

In the form of apparatus shown in Figs. 3 and 4, there is a chamber 30 into which there is a cold water inlet 11, with a steam control valve 12 and steam nozzle 13, as in the other forms. However, the segregated control chamber 31 is constituted by a tube in the upper part of chamber 30, having an open inlet end 32 above the steam nozzle and a discharge 33 at the other end into a blending chamber 34 above which there is an air chamber 35. The thermostat tube 16 and connections 17 to the steam control valve may be the same as in Fig. 1. Hot water is drawn off at 36 from chamber 34.

In the form shown in Fig. 5, there is a container 40, oblong in cross section, and divided into chambers by horizontal partitions. The lower partition 41, stops short of the steam inlet end, leaving an opening 42 from the heating chamber 43 below the partition to the control chamber 44 between partition 41 and the upper partition 45. The upper partition stops short of the water inlet end of the container 40, and so provides an opening 46 at that end from the control chamber into chamber 47 in the top of the container. An outlet 48 is provided from the top of the container at the steam inlet end, and an air chamber 49 is connected to the top of the container at the water inlet end, directly above opening 46.

The operation of the apparatus described will be fairly obvious from its construction but for convenience will be described briefly, and the special advantages thereof indicated.

The blending chamber 23 is employed where there is special need of guarding against fluctuating temperatures. In itself this feature is old and may be employed or not. In other words, the chamber or tank 23 may be omitted from the apparatus shown in Figure 1 and pipe 24 connected directly to the outlet from which the water is used, and likewise in the form shown in Figure 2 the final outlet may be connected to pipe 24' or a blending chamber or tank may be interposed.

When water is drawn off from pipe 24, 24', 36 or 48, there is an immediate flow into the heating chamber from pipe 11 to take the place of the drawn off water. When the cold water from pipe 11 reaches the control chamber the thermostat operates to open the steam valve and steam flows from nozzle 13 into the heating chamber and heats the water. There will be a small quantity of water between the nozzle and the thermostat which is not heated and so there is a slight drop in the temperature of the water at the start of the heating operation. However, during the time that water is being drawn off, the thermostat controls the steam valve so as to maintain the temperature very close to that at which the thermostat is set.

A construction resembling that disclosed herein but attempting to control the temperature by a thermostat placed in the heating chamber has been given a thorough trial but does not satisfactorily control the temperature as it is impossible to maintain a sufficiently even temperature in different portions of the heating chamber. With the arrangement shown with the water flowing past the thermostat tube in a relatively restricted stream, the fluctuations in the thermostat are minimized, and the consequent flow of steam is relatively even. The pipe 15, 15', or 31, or chamber 44 is made as small as the maximum required flow of water therethrough will permit in order to confine the stream in close relation to the controlling thermostat tube. While it is shown as being nearly the same length as the heating chamber, the length may be varied in accordance with the requirements for proper control in the particular installation, and need be no longer than that particular installation requires. The arrangement shown in Figures 1 and 3, whereby there is provided a water jacket around the control tube 15, is preferred, but the construction shown in Fig. 2 is sufficient for many purposes and is a simpler and cheaper construction than that shown in Fig. 1. The structure shown in Fig. 5 is also a very simple construction, and the partitions 41 and 45 give much of the effect of a water jacket.

When the flow of water from pipe 24, 24', 36 or 48 is stopped, the intake of water from pipe 1 stops likewise, but the flow of steam continues until the thermostat shuts off the valve. During this period the added steam, even where it is immediately condensed, adds somewhat to the quantity of water in the chambers, and air chamber 21, 35 or 49 aids in relieving any difficulty which might otherwise arise from this source. It also minimizes pounding which might result from irregularities arising from other causes.

Any satisfactory heating chamber and steam nozzle may be employed with the temperature control which is the chief feature of this invention. However, for smooth operation, the arrangement shown in the Monahan Patent No. 2,094,664, October 5, 1937, is recommended. For even and smooth heating effect it is preferred that chamber 10 be at least double the diameter of nozzle 13 in order for it to have a water capacity sufficient for it to absorb and condense the steam. However, for prompt response of the thermostatic control, it is preferable that pipe 18 shall be as short as it may be and as small as flow requirements permit, so that there is a small amount of water between the heating chamber and the temperature control zone; and in this respect the constructions shown in Figs. 3 to 5 are best.

In the construction shown the temperature control chamber is above and parallel with the heating chamber. This is a convenient and compact arrangement, but the chambers may be arranged at other angles if desired. However, it is advantageous to have the connection 18 between the two chambers at the steam nozzle end of the heating chamber and at the opposite end of the control chamber from the outlet. Also, it is preferable to have the temperature control chamber above the heating chamber and the connection substantially vertical so that when steam is admitted through the nozzle 13 the heated water will rise by convection and affect the operation of the thermostat. It has been indicated above how this is important at the closing of a heating period. It will be readily understood also that if the apparatus stands for a considerable time without any water being drawn off, the water in the temperature control chamber may cool down to such an extent that the steam valve will be opened.

Under such circumstances it is important that the heated water shall rise and control the thermostat, even though there is no flow of water through the chambers. For this purpose the location of the temperature control chamber above the heating chamber is essential. It will be understood also that the air chamber permits the condensation of sufficient steam to heat the water up to the temperature at which the steam valve is closed when no water is drawn off from the outlet pipe. In fact, in each of the embodiments shown, the parts are so arranged that when steam is turned on with the outlet closed, the increase in volume in the heating chamber forces water up through and along the control chamber to the air chamber, thus providing for the contact of heated water with the thermostat for shutting off the steam.

In each of the forms shown, the temperature control chamber is a relatively restricted, elongated chamber in which the water must flow for an appreciable distance closely adjacent the thermostat tube. The inlet to the control chamber is directly over the steam nozzle so that heated water will tend to rise by convection into the control chamber, and the inlet into the control chamber is so located as to minimize any danger of cold water flowing directly from the source thereof into the control chamber without contact with steam. The air chamber is so located that expansion of the volume in the heating chamber forces water from the most highly heated portion of that chamber into and through the control chamber while the expansion is taken care of by the air chamber. The parallel arrangement of heating and control chambers constitutes a very compact arrangement and facilitates obtaining the advantages enumerated.

While reference has been made throughout to the heating of water, it will be readily understood that the apparatus may be employed for heating other liquids.

While several constructions have been disclosed with some particularity it will be understood that various other changes may be made in the construction within the scope of the appended claims.

What we claim is:

1. A heater comprising a horizontally elongated heating chamber with a liquid inlet at one end and a steam inlet at the other end, a valve controlling the steam inlet, an elongated control chamber having a smaller cross section than the heating chamber and an inlet for heated liquid from the heating chamber directly above the steam inlet, a thermostat tube disposed longitudinally of the control chamber and controlling said valve, and an air chamber into which liquid can pass from the other end of the control chamber from said inlet to that chamber.

2. A heater comprising a container having a horizontally elongated heating chamber therein with an inlet for liquid at one end and a nozzle for steam admitted at the other end, a valve controlling the steam inlet, an elongated control chamber partitioned off from the upper part of the heating chamber and of reduced cross section with an inlet from the heating chamber over the nozzle and an outlet from its other end, and a thermostat tube running longitudinally of the control chamber and governing the valve.

3. A heater in accordance with claim 2 and having an air chamber connected with the outlet from the control chamber.

4. A heater comprising a container oblong in vertical cross section, two horizontal partitions across the chamber and dividing the container into three chambers, the lower of which is a horizontally elongated heating chamber having an inlet for liquid at one end and an inlet for steam at the other end, a valve controlling the steam inlet, the middle chamber being an elongated control chamber more restricted in cross section than the heating chamber, a thermostat tube running longitudinally of the control chamber and controlling the admission of steam, the lower partition having an inlet opening above the steam inlet from the heating chamber to the control chamber, and the upper partition having an opening therethrough at its end above the liquid inlet and into the upper chamber.

5. A heater in accordance with claim 4 and comprising an air chamber above and connected with the liquid in the upper of said three chambers.

6. A liquid heater comprising a heating chamber having a liquid inlet and a steam inlet spaced apart horizontally with incoming steam directed towards the liquid inlet, a valve controlling admission of steam at said steam inlet, an elongated temperature control chamber, a thermostat tube extending longitudinally of said control chamber and controlling said valve, said control chamber having an inlet for hot liquid from the heating chamber directly over said steam inlet and an outlet at its other end from the inlet, and an air chamber connected to said outlet.

HERMAN C. WOBSER.
RAYMOND A. MONAHAN.

REFERENCES CITED

The following references are of record in the file of this patent:

UNITED STATES PATENTS

| Number | Name | Date |
| --- | --- | --- |
| 507,633 | Peck | Oct. 31, 1893 |
| 1,152,459 | Weld | Sept. 7, 1915 |
| 1,806,394 | Geisler et al. | May 19, 1931 |
| 2,146,148 | Knipper | Feb. 7, 1939 |
| 2,372,533 | Torbett | Mar. 27, 1945 |
| 2,395,697 | Tidd | Feb. 26, 1946 |